United States Patent [19]

Thomas

[11] Patent Number: 5,309,972
[45] Date of Patent: May 10, 1994

[54] AIR VENT COVER

[76] Inventor: Allen C. Thomas, 4510 W. Alva, Tampa, Fla. 33614

[21] Appl. No.: 81,067

[22] Filed: Jun. 22, 1993

Related U.S. Application Data

[63] Continuation of Ser. No. 877,732, May 4, 1992, abandoned, which is a continuation-in-part of Ser. No. 659,937, Feb. 25, 1991, Pat. No. Des. 330,415.

[51] Int. Cl.[5] .............................................. A47H 1/00
[52] U.S. Cl. ..................................... 160/90; 160/104; 454/94
[58] Field of Search .................... 160/90, 104, 105; 454/94, 95, 136

[56] References Cited

U.S. PATENT DOCUMENTS

| | | |
|---|---|---|
| D. 259,508 | 6/1981 | Giles . |
| D. 320,267 | 9/1991 | Thomas . |
| 727,019 | 5/1903 | Stewart . |
| 1,606,410 | 11/1926 | Frame . |
| 1,660,168 | 2/1928 | Kimball ......................... 160/104 X |
| 1,958,342 | 5/1934 | Johnson ......................... 160/104 X |
| 2,127,939 | 9/1939 | Lintern et al. . |
| 2,294,363 | 9/1942 | Brockway . |
| 2,550,353 | 4/1951 | Hopfinger . |
| 2,962,137 | 11/1960 | Milavec ......................... 160/104 X |
| 3,064,725 | 11/1962 | Roark ......................... 160/105 |
| 3,085,490 | 4/1963 | Field . |
| 3,738,621 | 6/1973 | Anderson . |
| 4,026,971 | 5/1977 | Glasoe . |
| 4,196,657 | 4/1980 | Crongeyer et al. . |
| 4,759,270 | 7/1988 | Lindeen . |

FOREIGN PATENT DOCUMENTS

| | | | |
|---|---|---|---|
| 242303 | 12/1962 | Australia .................... | 160/105 |
| 2613666 | 3/1976 | Fed. Rep. of Germany . | |

OTHER PUBLICATIONS

Copies of photos of prior art submitted in U.S. Pat. No. Des. 320,267.
1981 Sweet's cat., vol. 11, Sect. 10.19/So, p. 3, Amcor Roof Louvers RV-75, DV-75, RV-73, top right side of pg.
J. C. Whitney's cat. ©1979, p. 25, roof air scoops 1, 2, 3, top left & middle left sides of pg., respectively.

Primary Examiner—Blair M. Johnson
Attorney, Agent, or Firm—Frijouf, Rust & Pyle

[57] ABSTRACT

An apparatus is disclosed for an improved device for covering an aperture disposed on a horizontal surface. The cover has sidewalls, a top surface, and a lip which defines a cover opening within a sidewall. The improvement comprises a first and a second guide rail extending from the cover and disposed on opposed first and second sides of the cover opening. A slot is defined in the cover and disposed along a third side of the cover opening. A frame defines a screened window and includes fastener projections which extend outwardly from the frame. The frame is inserted within the slot with a first and a second side of the frame being guided by the first and second opposed guide rails. The fastener projections engage the lip of the cover opening for retaining the frame and the screened window within the cover opening.

11 Claims, 5 Drawing Sheets

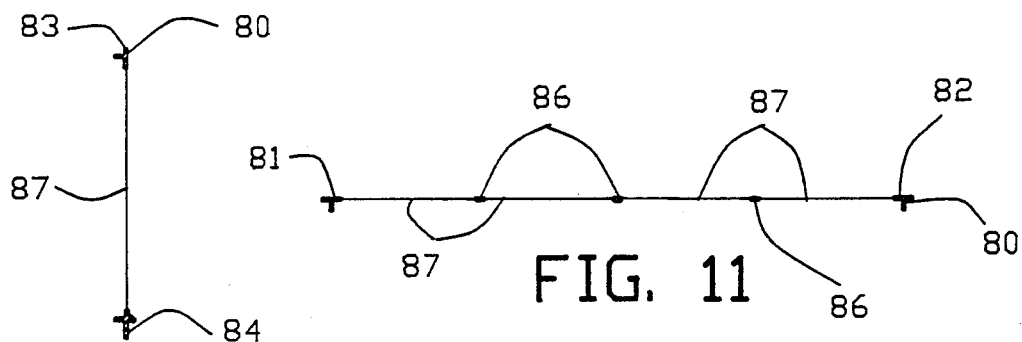
FIG. 10
FIG. 11
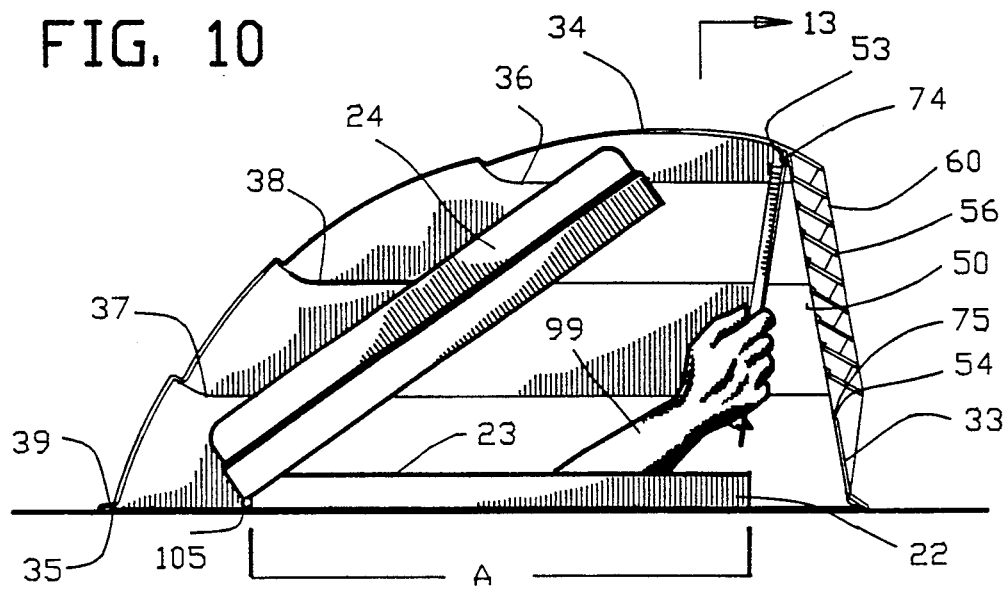
FIG. 12
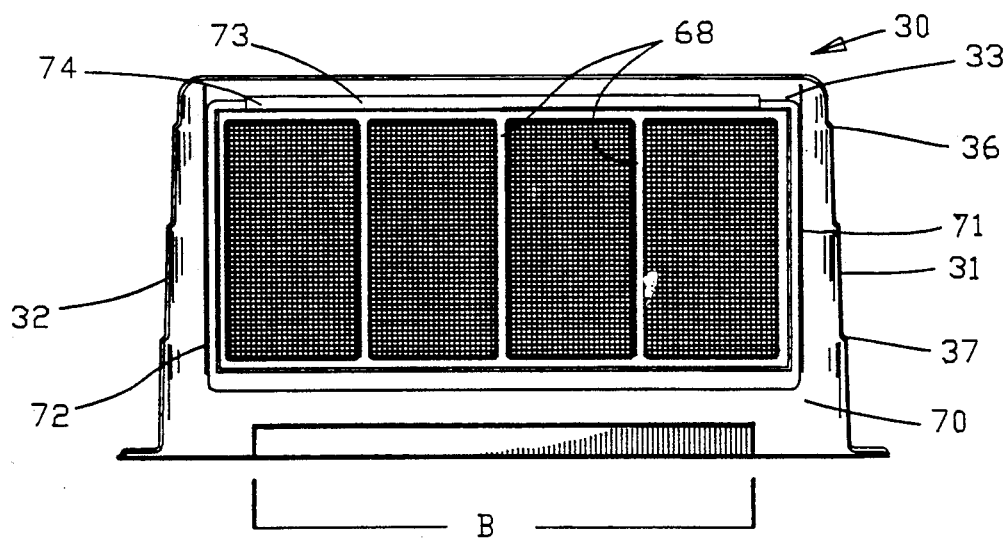
FIG. 13

AIR VENT COVER

CROSS-REFERENCE TO RELATED APPLICATIONS

This application is a continuation of application Ser. No. 07/877,732 filed May 4, 1992, now abandoned, which is a continuation-in-part of application Ser. No. 07/659,937 filed Feb. 25, 1991, Pat. No. D 330,415 the disclosures of which are incorporated herein by reference.

BACKGROUND OF THE INVENTION

1. Field of the Invention

This invention relates to a device for covering an aperture on a horizontal surface, and more specifically relates to a device for covering an air vent on a motor home or similar vehicle.

2. Information Disclosure Statement

Recreational and other vehicles contain air vent openings to facilitate the entry of fresh air into the vehicle. These openings are typically located on a top horizontal surface of the vehicle and have air vent caps overlying the air vent openings. The air vent caps generally pivot about a hinge on the front of the air vent cap to open toward the rear of the vehicle for venting the vehicle. The air vent cap allows for the entry of fresh air into the vehicle and allows for the escape of gasses from the vehicle. Unfortunately, these air vent openings also allow for the entry into the vehicle of liquid and solid matter along with the fresh air. To overcome this problem, the prior art developed air vent covers for mounting over the air vent open and the air vent cap to obstruct the flow of liquids and solids while allowing the flow of fresh air and gases between the outside and the interior of the vehicle.

The prior art discloses a variety of air vent cover improvements. In general, the prior art vent covers had sidewalls for supporting a top to provide sufficient clearance for the air vent cap to pivot into an open position. The top was frequently tapered toward the front to provide for a more aerodynamic surface. A grill was typically mounted in a rearward facing sidewall with the grill having louvers to deflect foreign matter such as rain from entering the interior of the air vent cover. A screen was secured to cover the grill to prevent small foreign objects such as insects, dust and the like from entering the interior of the air vent cover. The air vent cover was often of a one-piece construction being molded from plastic or other durable and weather resistant materials. The air vent cover was affixed to the roof of the vehicle by mechanical means such as a bracket molded into the air vent cover.

These air vent covers greatly enhanced the art of providing protection of the air vent for the interior of the vehicle from outside elements. However, the air vent covers of the prior art suffer from various shortcomings. The screen secured to the grill of the air vent cover was one of the more fragile components of the air vent cover thus requiring periodic maintenance. After the screen became dirty because of screen-sized particulate matter and insects striking and becoming lodged in the screen, it was necessary to periodically clean and repair the screen.

Repairing the screen in place involved climbing on top of the vehicle and making repairs in an inconvenient position. Moreover, since the screen was internal to the air vent cover, the grill substantially obscured the screen making the cleaning of the screen from the outside difficult or impossible. The grill inhibited the scrubbing or brushing of the screen from the outside. Also, spraying the screen with a hose from the outside is less effective than from the inside, since most of the particles were normally lodged on the outside of the screen.

Therefore the repair or cleaning of the screen was not a convenient task. A person must climb on top of the vehicle and the entire cover must be removed in order to work on the screen. During such removal, the air vent opening is exposed to the environment. In addition, the use of tools was normally required to complete the task. Another shortcoming of the prior art air vent cover was the failure to effectively prevent precipitation from being driven through the grill into the air vent and thus into the vehicle.

Therefore, it is an object of the present invention to provide an improved device for covering an air vent on a vehicle comprising a screen which can be removed without the need for climbing on top of the vehicle.

Another object of this invention is to provide an improved device for covering an air vent on a vehicle comprising a screen which can be removed from the inside of the vehicle.

Another object of this invention is to provide an improved device for covering an air vent on a vehicle comprising a screen which can be installed from the inside of the vehicle.

Another object of this invention is to provide an improved device for covering an air vent on a vehicle comprising a screen which can be removed and installed by hand without the need for tools.

Another object of this invention is to provide an improved device for covering an air vent on a vehicle comprising a screen which can be easily removed and reinstalled in areas of restricted movement or limited visibility.

Another object of this invention is to provide an improved device for covering an air vent on a vehicle comprising a screen which can be removed and washed from the inside of the vehicle.

Another object of this invention is to provide an improved device for covering an air vent on a vehicle comprising a grill which can effectively inhibit precipitation from being driven through the grill of the air vent cover into the vehicle.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with a specific embodiment being shown in the attached drawings. For the purpose of summarizing the invention, the invention relates to an improved air vent cover for covering an aperture disposed on a horizontal surface. The air vent cover has sidewall means and a top surface. A lip defines a cover opening within the sidewall means. The air vent cover includes means for affixing the air vent cover to the horizontal surface. The improvement comprises a first and a second guide rail extending from the air vent cover and disposed on opposed first and second sides of the cover opening, respectively. A slot is defined in the air vent cover and disposed along a third side of the cover opening. A frame defines a screened window and includes fastener projections which extend outwardly from the frame enabling the frame to be inserted within the slot with a first and a second side of the frame being guided by the first and second opposed guide rails. The fastener projections engage the lip of the cover opening for retaining the frame relative to the sidewall means.

In a more specific embodiment of the invention, the first and second guide rails are disposed on an interior surface of the air vent cover and are integrally formed with the air vent cover. The slot is defined between an L-shaped boss extending from the interior surface and the interior surface of the cover.

The frame is formed of a flexible material for enabling the fastener projections to resiliently engage with the lip of the cover opening. The frame extends about a frame window with a screen being secured to the frame for overlying a frame window.

In a more specific embodiment, the screen is placed into a mold and the frame is molded about the screen. In the alternative, the screen may be adhesively secured to the frame. The frame has a dimension which is less than a dimension of the aperture disposed on the horizontal surface. This dimensional relationship allows the frame to be removed through the aperture in the horizontal surface. When the horizontal surface is a part of the vehicle, the frame may be removed through the aperture from inside of the vehicle. Optionally, a screen mounting means such as a hook and loop fastener may be added to the frame for removably mounting the screen relative to the frame.

In another embodiment of the invention, the cover opening is protected by a grill comprising a plurality of horizontally disposed horizontal louver blades. Each of the horizontal louver blades has a water-stop projection for inhibiting the passage of precipitation through the louver blades. Preferably, the water-stop projections are mounted on an internal edge of each of the louver blades.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 10 is a sectional view along line 10—10 in FIG. 9;

FIG. 11 is a sectional view along line 11—11 in FIG. 9;

FIG. 12 is a sectional view similar to FIG. 5 with the air vent cover mounted on the horizontal surface illustrating the frame and screen being mounted on the air vent cover;

FIG. 13 is a sectional view along line 13—13 in FIG. 12 illustrating the frame and screen being brought into position between guide rails;

Similar reference characters refer to similar parts throughout the several Figures of the drawings.

DETAILED DISCUSSION

Figure 1:
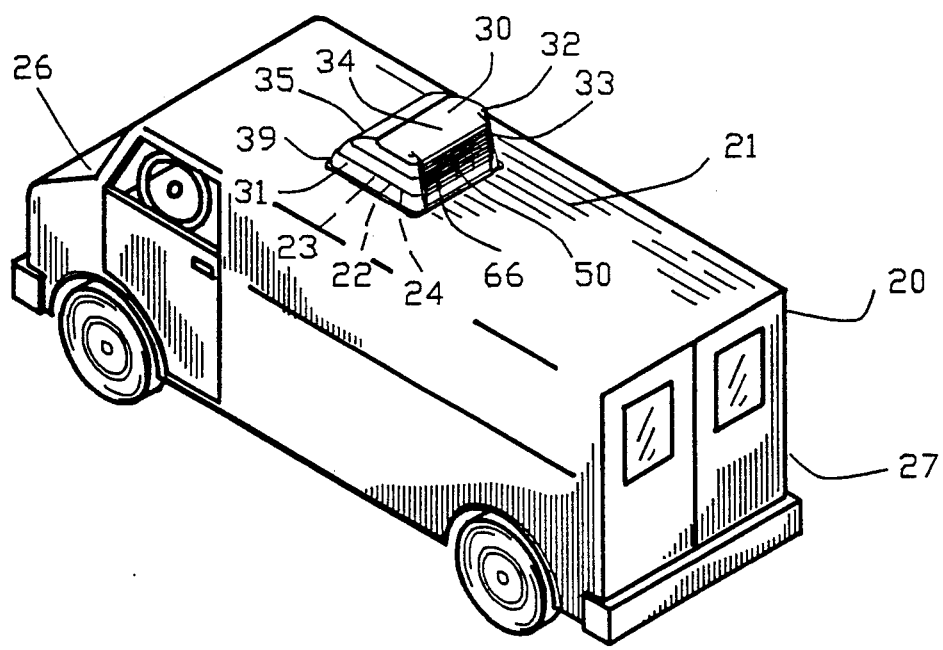
FIG. 1 is an isometric view of an air vent cover of the present invention disposed upon a vehicle.
Figure 2:
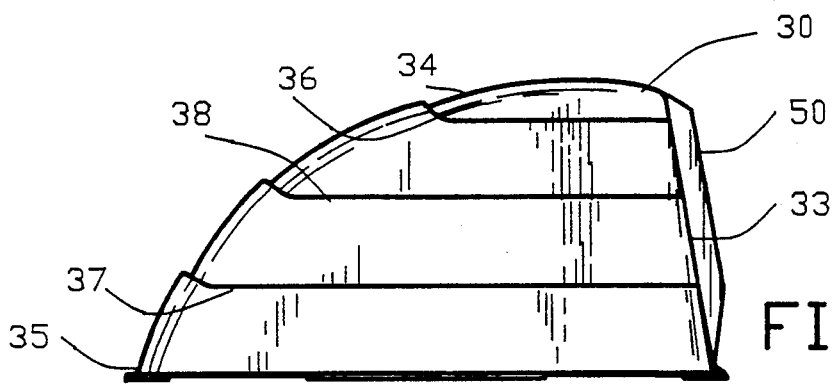
FIG. 2 is a side view of the air vent cover of FIG. 1.
Figure 3:
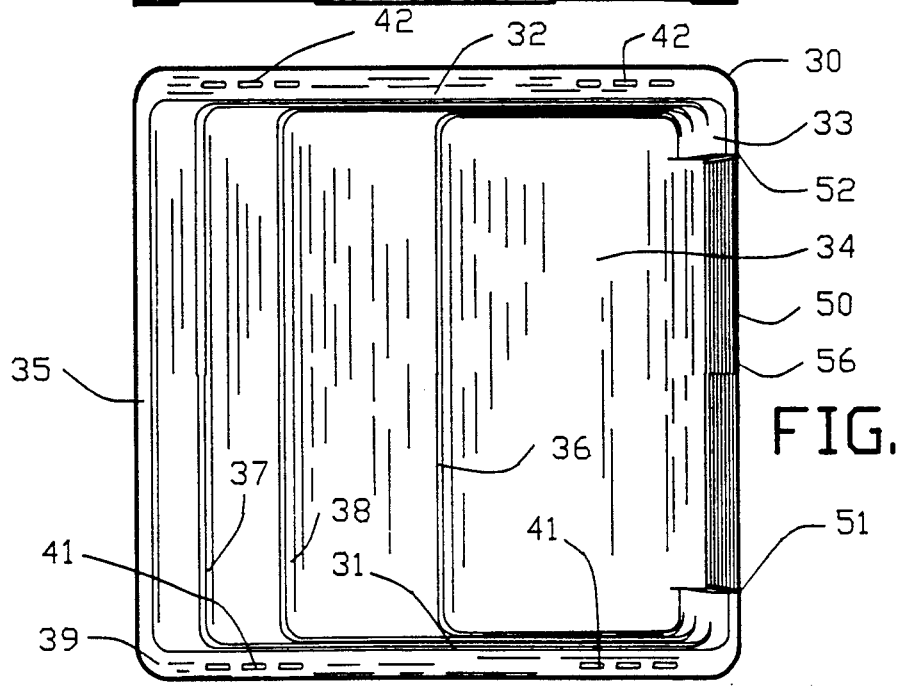
FIG. 3 is a top view of FIG. 2.
Figure 4:
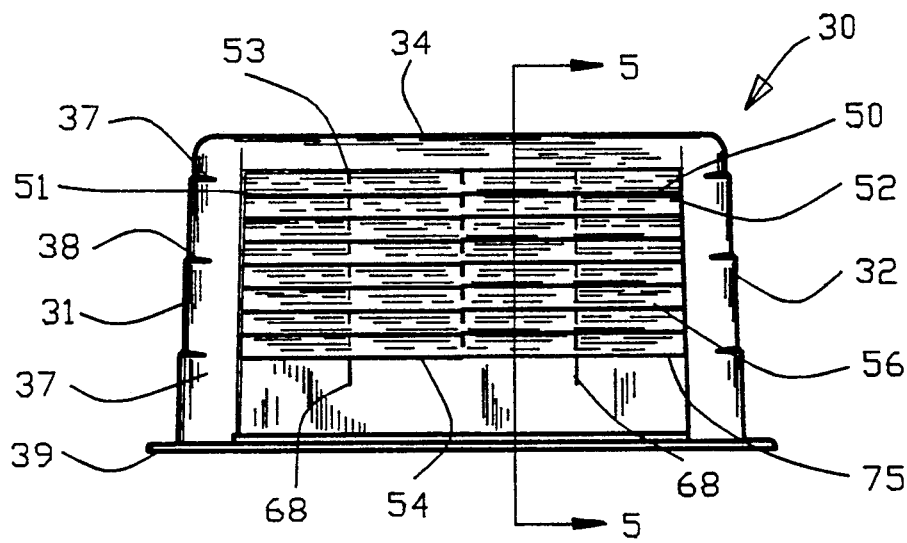
FIG. 4 is a rear view of FIG. 2.
Figure 5:
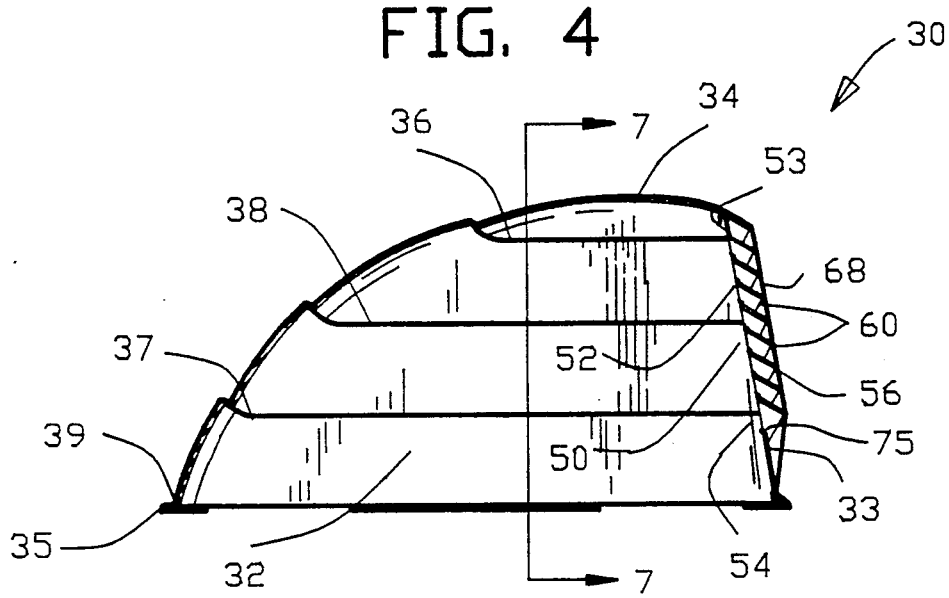
FIG. 5 is a sectional view along line 5—5 of FIG. 4.

FIG. 1 is an isometric view of a recreational vehicle 20 having a horizontal top surface shown as a roof 21. A skylight is mounted 22 in the roof 21 of the vehicle 20 for defining an aperture 23 for use as an air vent for the vehicle 20. As will be shown in greater detail hereinafter, an air vent cap 24 covers the aperture 23. The vehicle 20 comprises a front end 26 and a rear end 27 in a conventional fashion. An air vent cover 30 of the present invention is mounted on the vehicle 20 to cover the aperture 23 and the air vent cap 24. The air vent cover 30 can similarly be mounted on a van, mobile home or other type of vehicle (not shown).

FIGS. 2-7 illustrate the air vent cover 30 in greater detail comprising sidewall means, shown as a first sidewall 31, a second sidewall 32, and a rear sidewall 33 which provide support for a top surface 34. Preferably, the air vent cover 30 is molded as a single unit and is preferably constructed of plastic or other weather resistant material. The first and second sidewalls 31 and 32 are substantially vertical relative to the roof 21. The rear sidewall 33 is angled toward the rear end 27. The top surface 34 is tapered from the rear sidewall 33 to a leading edge 35 of air vent cover 30. Top and bottom horizontal ridges 36 and 37 run horizontally about the air vent cover 30 for added structural strength. An intermediate ridge 38 further increases structural strength. The air vent cover 30 is affixed to roof 21 by means shown as a base projection 39 define holes 41 and 42.

As shown in FIG. 1, the air vent cover 30 is mounted relative to the vehicle 20 such that the rear sidewall 33 is aligned toward the rear end 27 of the vehicle 20, and the leading edge 35 of the air vent cover 30 is aligned toward the front end 26 of the vehicle 20. Conventional bolts (not shown) are inserted through the holes 41 and 42 in the base projection 39 to secure the air vent cover 30 to the roof 21 of the vehicle 20.

Figure 6:
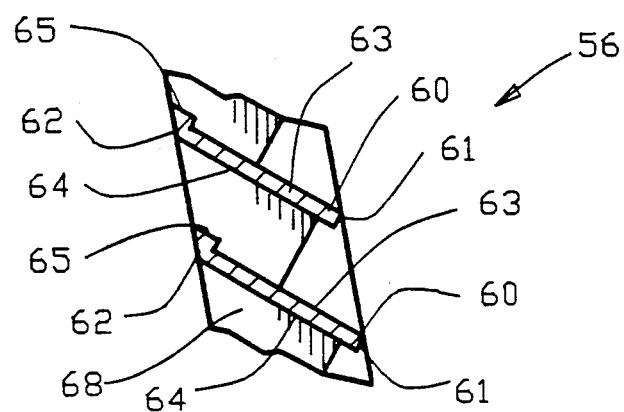
FIG. 6 is an enlarged view of a portion of FIG. 5.

The rear sidewall 33 includes a cover opening 50 having a first through fourth side 51-54. The cover opening 50 is covered by a grill 56 having a plurality of louver blades 60. As best shown in FIG. 6, each of the louver blades 60 has an external edge 61, an internal edge 62, a top surface 63, and a bottom surface 64. Each of the louver blades 60 is mounted downward at an acute angle from the horizontal with the external edge 61 being closer to the roof 21 than the internal edge 62. A water stop 65 is molded on the top surface 63 near the internal edge 62 of each of the louver blades 60. The plurality of louver blades 60 are mounted in a horizontal orientation and are supported by vertical ribs 68.

Wind-driven precipitation will contact and adhere to the top surface 63 of the louver blade 60 and will be driven back and upwardly along the top surface 63 of the louver blade 60 from the external edge 61 toward the internal edge 62. The precipitation is inhibited from further backward movement when the water stop 65 is encountered. Rain is thereby inhibited from entering the interior of the air vent cover 30 or into the vehicle 20.

Figure 7:
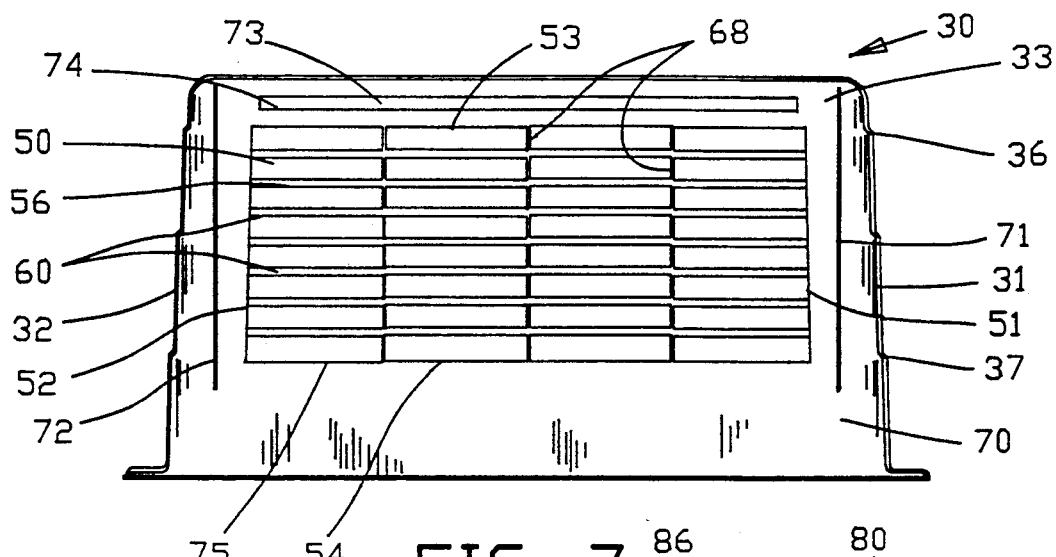
FIG. 7 is an interior view of the air vent cover as seen along line 7—7 in FIG. 5.
Figure 8:
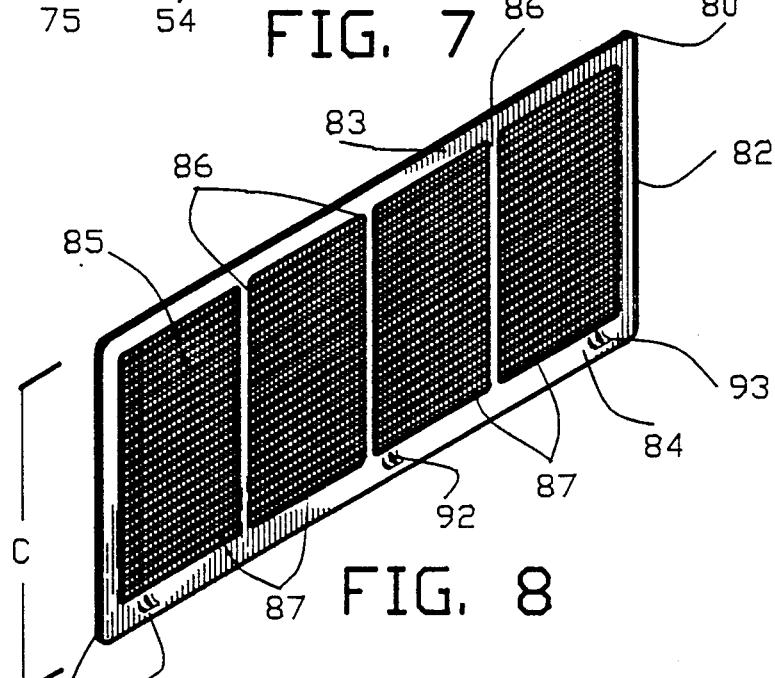
FIG. 8 is an isometric view of a frame with a screen mounted thereon.
Figure 9:
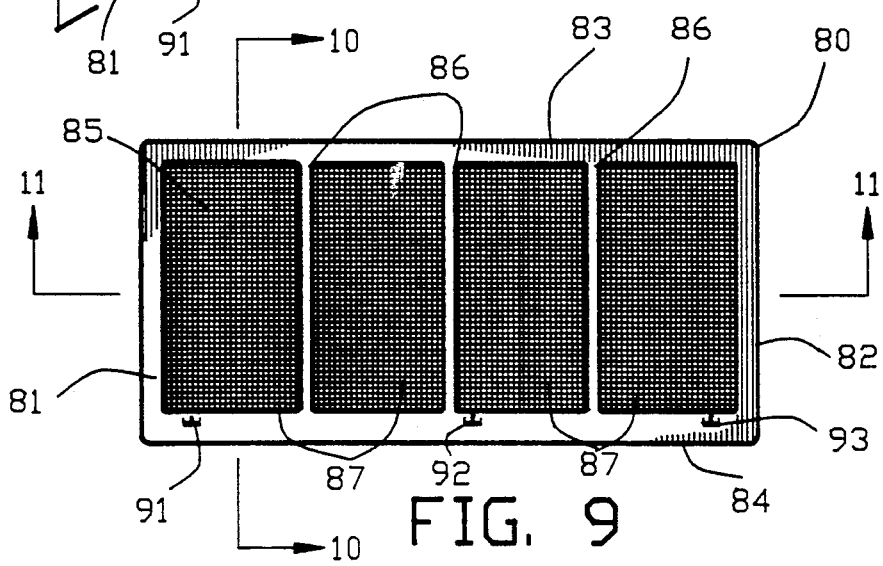
FIG. 9 is a rear view of the frame and screen of FIG. 8.

As shown in FIG. 7, a first and a second guide rail 71 and 72, are molded on an interior surface 70 of the rear sidewall 33 and are disposed adjacent the opposed first and second sides 51 and 52 of the cover opening 50. An L-shaped boss 73 is molded on the third side 53 of the cover opening 50 on the interior surface 70 of the rear sidewall 33. The L-shaped boss 73 and the interior surface 70 define a slot 74. The lip 75 is disposed on the fourth side 54 of cover opening 50.

FIGS. 8-11 show a frame 80, which is semi-rigid, but flexible and resilient and preferably being molded of polypropylene or other similar material. The frame 80 has a dimension C which is less than a dimension A or a dimension B of the air vent 23 shown in FIGS. 12 and 13. The frame 80 defines a frame window 85 and comprises multiple ribs 86 which cross the frame window 85. A screen 87 is mounted on the frame 80 by screen mounting means 88 such that screen 87 covers the frame window 85. In the preferred embodiment, the screen 87 is integrally molded into the frame 80. Under this method, the screen 87 is placed into a mold (not shown) and the frame 80 is molded about the screen 87. However, screen mounting means 88 may also comprise glue or other conventional screen-mounting techniques such as hook and loop fasteners.

The frame 80 comprises a first side, a second side, a third side and a fourth side, 81, 82, 83 and 84, respectively. A first through third fastener projection 91-93 are molded into the fourth side 84 of the frame 80. The third fastener projection 93 is positioned slightly off center to avoid striking the vertical rib 68 located at the center of the grill 56.

As shown in FIGS. 12 and 13, the frame 80 is mounted on the interior surface 70 of the rear sidewall 33 for covering the cover opening 50. The sidewall means 31, 32, and 33 and the top surface 34 provide sufficient clearance for the air vent cap 24 to pivot about the hinge 105 to allow a person to extend an arm 99 through the air vent 23 as shown in FIG. 12. The first and second sides 81 and 82 of the frame 80 abut the guide rails 71 and 72 respectively, to prevent lateral movement of the frame 80. The third side 83 of the frame 80 is received within the slot 74. The first, second and third fastener projections 91, 92 and 93 mounted on the fourth side 84 of the frame 80 engage the lip 75 defining the cover opening 50. The slot 74 and the fastener projections 91, 92 and 93 thereby prevent vertical movement of the frame 80 and resiliently retain the frame 80 against the interior surface 70 of the rear sidewall 33.

The operational environment of the air vent cover 30 is shown in FIG. 1, mounted over the air vent 23 on the roof 21 of the vehicle 20. The frame 80 comprising the screen 87 is mounted on the rear sidewall 33 facing the rear end 27 of the vehicle 20. The air vent cover 30 enables wind to pass over the louver blades 60, through the opening 50 and through screen 87. The wind is directed downwardly by the tapered top surface 34 into the air vent 23 into vehicle 20. The louver blades 60 inhibit large objects from entering the air vent cover 30 as well as protecting the screen 87 from damage. The screen 87 inhibits small objects such as dust, small debris, and insects from entering the air vent cover 30 while enabling filtered air to pass into vehicle 20.

The installation and removal of the frame 80 from the air vent cover 30 is shown in FIGS. 14-18 and may be performed while the air vent cover 30 is secured to the vehicle 20. As represented in FIG. 12, the air vent cover 30 provides sufficient clearance to allow air vent cap 24 to pivot open wide enough to allow a person to reach, as shown by arm 99, through the air vent 23 and to easily remove or install the frame 80 from the cover opening 50. Dimension C of the frame 80 is less than dimension A or dimension B of the vent cover base 23, thus allowing for passage of the frame 80 through the air vent 23.

Figures 14, 15:
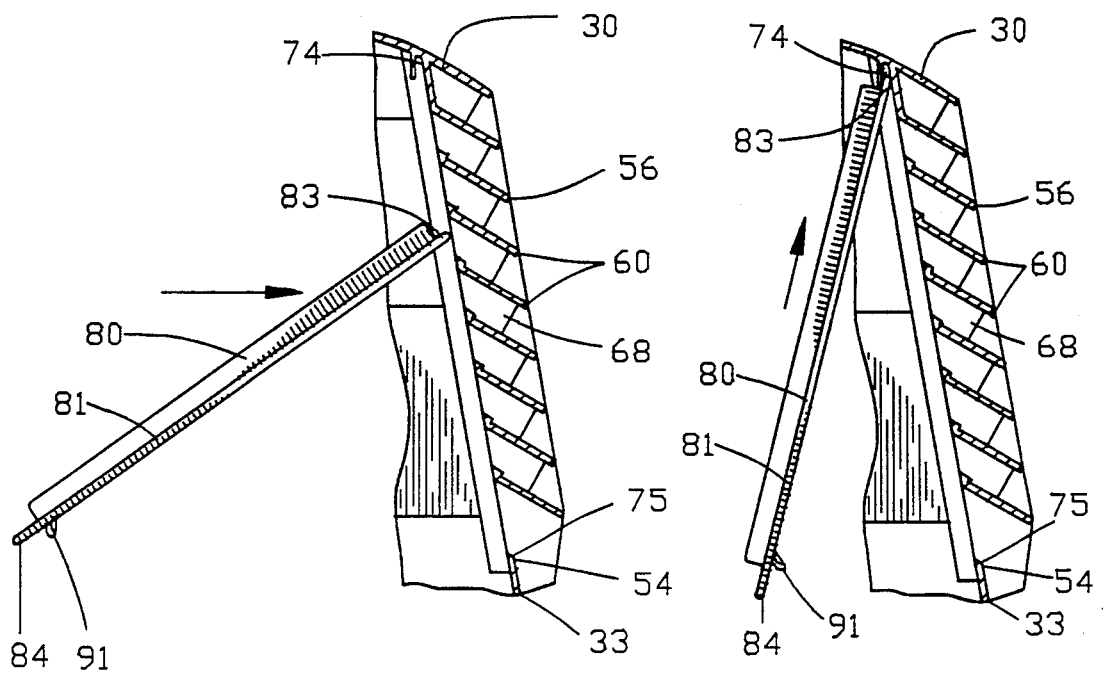
FIG. 14 is an enlarged sectional view of a portion of FIG. 5 illustrating the frame and screen being brought into position between guide rails.
FIG. 15 is a sectional view similar to FIG. 14 illustrating the frame and screen being moved vertically into a slot.

To install the frame 80 on the cover opening 50, the third side 83 of the frame 80 is placed against the interior surface 70 of the rear sidewall 33 between the first and second guide rails 71 and 72 below the slot 74 and above the lip 75 as shown in FIG. 14. The first and second guide rails 71 and 72 prevent lateral movement of the frame 80 relative to the air vent cover 30.

Figures 16, 17, 18:
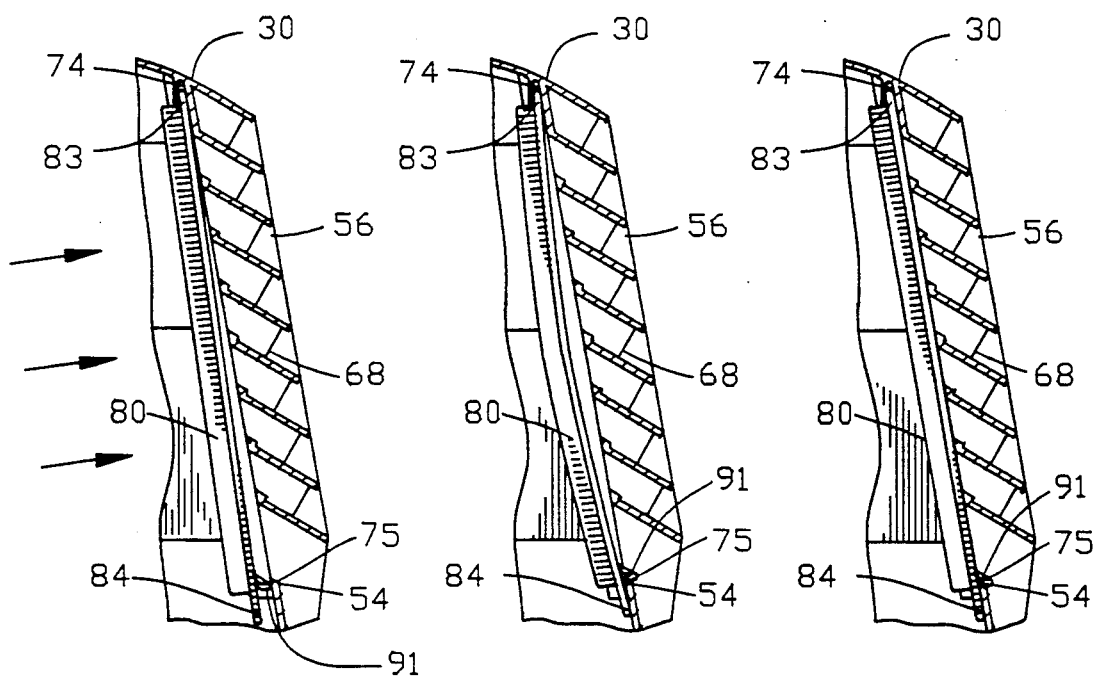
FIG. 16 is a sectional view similar to FIG. 14 illustrating the frame and screen being pivoted about the slot and brought into position adjacent to a grill.
FIG. 17 is a sectional view similar to FIG. 14 illustrating the frame being deformed to enable the fastener projections to engage a lip of the grill.
FIG. 18 is a sectional view similar to FIG. 14 illustrating the final position of the frame and screen mounted on the air vent cover.

As shown in FIG. 15, the frame 80 is pushed upwards, and the third side 83 of the frame 80 slides upwardly against the interior surface 70 of the rear sidewall 33 until the third side 83 is totally received within the slot 74. Maintaining an upward pressure, the frame 80 is pushed in a forward direction to pivot about the slot 74 until the fastener projections 91, 92 and 93 encounter the lip 75, as shown in FIG. 16. The vertical dimension of the frame 80 between the slot 74 and the fastener projections 91, 92 and 93 exceeds the vertical dimension of the rear sidewall 33 between the slot 74 and lip 75.

The frame 80 is constructed of a flexible material and may be deformed slightly as shown in FIG. 17 to allow the fastener projections 91, 92 and 93 to resiliently engage the lip 75. In addition, each of the fastener projections 91, 92 and 93 may be deform to allow each of the fastener projections 91, 92 and 93 to engage the lip 75.

FIG. 18 shows the frame 80 in a mounted position secured against the interior surface 70 of the rear sidewall 33. Lateral movement of the frame 80 is prevented by the guide rails 71 and 72. Vertical movement of the frame 80 is prevented by the slot 74 and the fastener projections 91, 92 and 93 resiliently engaging the lip 75.

Similarly, the frame 80 may be removed by applying a lifting and back pressure against the fourth side 84 of the frame 80 whereby the frame 80 is deformed slightly to release the fastener projections 91, 92 and 93 from engaging the lip 75. The frame 80 can thereby be removed by reversing the procedure described above and shown in FIGS. 14-18.

The air vent cover 30 offers a number of advantages over the covers of the prior art. The air vent cover 30 provides covering and protection for the air vent 23 on the vehicle 20 while enabling the frame 80 and the screen 87 to be removed or installed by a person from inside of the vehicle 20. The frame 80 and the screen 87 can be easily removed and installed by hand without the need for any tools. After the frame 80 and the screen 87 is removed, the screen 87 can be washed in place from internal the vehicle 20.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A cover for covering an aperture disposed in a horizontal surface, the cover having a substantially vertical sidewall means and a top surface with a lip defining a cover opening within the sidewall means, and means for affixing the cover to the horizontal surface; the improvement comprising:
    a first and a second guide rail extending from the cover;
    said first and second guide rails being disposed on opposed first and second sides of the cover opening, respectively;
    a slot defined in the cover and being disposed along a third side of the cover opening;
    a frame defining a screened window; and
    fastener projections extending outwardly from said frame enabling said frame to be inserted within said slot with a first and second side of said frame being guided by said first and second opposed guide rails and with said fastener projections engaging the lip defining the cover opening for retaining said frame with said screened window shielding the cover opening.

2. A cover as set forth in claim 1, wherein said first and second guide rails are disposed on an interior surface of the cover.

3. A cover as set forth in claim 1, wherein said first and second guide rails are disposed on an interior surface of the cover; and
    said first and second guide rails being integrally formed with the cover.

4. A cover as set forth in claim 1, wherein said slot is integrally formed with the cover; and
    said slot comprising an L-shaped boss extending from an interior surface of the cover for defining said slot between said L-shaped boss and said interior surface of the cover.

5. A cover as set forth in claim 1, wherein said frame is formed of a flexible material for enabling said fastener projections to resiliently engage with the lip of the cover opening.

6. A cover as set forth in claim 1, wherein said frame extends about a frame window; and
    said screened window comprising a screen secured to said frame for overlying said frame window.

7. A cover as set forth in claim 1, wherein said frame extends about a frame window; and
    said screened window comprising a screen being adhesively secured to said frame for overlying said frame window.

8. A cover as set forth in claim 1, wherein said frame has a dimension less than a dimension of the aperture disposed in the horizontal surface for allowing said frame to be passed through the aperture in the horizontal surface.

9. A cover as set forth in claim 1, wherein said cover opening comprises a plurality of horizontally disposed louver blades; and
    each of said plurality of horizontally disposed louver blades comprising a water-stop projection for inhibiting the passage of precipitation between said plurality of horizontally disposed louver blades.

10. A cover as set forth in claim 1, wherein said cover opening comprises a plurality of horizontally disposed louver blades;
    each of said plurality of horizontally disposed louver blades comprising a water-stop projection for inhibiting the passage of precipitation between said plurality of horizontally disposed louver blades; and
    each of said water-stop projections being mounted on an internal edge of each of said plurality of horizontally disposed louver blades.

11. A cover for covering an aperture disposed in a horizontal surface, the cover having a substantially vertical sidewall means and a top surface with a lip defining a cover opening within the sidewall means, and means for affixing the cover to the horizontal surface; the improvement comprising:
    a slot defined in the cover and being disposed along a side of the cover opening;
    a frame defining a screened window; and
    a fastener projection extending outwardly from said frame enabling said frame to be inserted within said slot with said fastener projection engaging the lip defining the cover opening for retaining said frame with said screened window shielding the cover opening.

* * * * *